(12) United States Patent
Yu et al.

(10) Patent No.: US 7,149,051 B2
(45) Date of Patent: Dec. 12, 2006

(54) HARD DISK DRIVE WITH CONNECTOR ASSEMBLY

(75) Inventors: Young Chee Yu, Ayer Tawar (MY); Ming-Goei Sheu, Cupertino, CA (US)

(73) Assignee: ESGW Holding Limited, Tortola (VG)

( * ) Notice: Subject to any disclaimer, the term of this patent is extended or adjusted under 35 U.S.C. 154(b) by 497 days.

(21) Appl. No.: 10/750,499

(22) Filed: Dec. 31, 2003

(65) Prior Publication Data
US 2005/0141133 A1  Jun. 30, 2005

(51) Int. Cl.
*G11B 17/02* (2006.01)
(52) U.S. Cl. .................................... 360/97.01
(58) Field of Classification Search ............. None
See application file for complete search history.

(56) References Cited

U.S. PATENT DOCUMENTS

| | | | |
|---|---|---|---|
| 5,392,175 A * | 2/1995 | Beecroft .................. | 360/97.01 |
| 5,420,733 A * | 5/1995 | Knighton et al. ......... | 360/97.01 |
| 5,646,801 A * | 7/1997 | Boigenzahn et al. .... | 360/97.01 |
| 5,673,157 A * | 9/1997 | Ycas et al. ............... | 360/97.01 |
| 5,751,514 A * | 5/1998 | Hyde et al. ............... | 360/97.01 |
| 5,881,454 A * | 3/1999 | Baxter et al. .................. | 29/843 |
| 6,108,162 A * | 8/2000 | Amirkiai et al. ......... | 360/97.01 |
| 6,129,579 A * | 10/2000 | Cox et al. .................... | 439/493 |
| 6,278,573 B1 * | 8/2001 | Uwabo et al. ........... | 360/97.02 |
| 6,278,574 B1 * | 8/2001 | Wakita et al. ........... | 360/99.01 |
| 6,385,006 B1 * | 5/2002 | Kaczeus et al. ......... | 360/97.01 |

* cited by examiner

*Primary Examiner*—Robert S. Tupper
(74) *Attorney, Agent, or Firm*—Saile Ackerman LLC; Stephen B. Ackerman

(57) ABSTRACT

A hard disk drive (1) includes a baseplate (10), a disk stack (90), a head stack (50), a spindle motor (80) and a connector assembly. The connector assembly includes a connector (100) and a circuit board (140). The connector includes a insulative base (110) and a plurality of contacts (124, 126, 128) extending from the insulative base and being soldered to the circuit board at one end thereof. The baseplate receiving the circuit board and the connector, includes a bottom wall (36), two side walls (39) and two separating walls (34) extending perpendicularly from the bottom wall. The insulative base of the connector, the bottom wall, the two side walls and the two separating walls corporately form three contacts receiving housing.

20 Claims, 5 Drawing Sheets

HARD DISK DRIVE WITH CONNECTOR ASSEMBLY

BACKGROUND OF THE INVENTION

1. Field of the Invention

The present invention generally relates to a hard disk drive with a connector assembly for connection between the hard disk drive and a computer system, and more particularly to a hard disk drive incorporating a connector assembly with simplified configurations and smaller weight.

2. Description of the Related Art

Various data storage devices are installed in electronic apparatus for communication and handling of data. Such devices include, for example, hard disk drives, floppy disk drives and Compact Disk-Read Only Memory (CD-ROM) drives. As computers have evolved into more sophisticated computer systems with smaller dimensions and lighter weight, efforts have been directed at providing increasing amounts of data storage with smaller weight or physical dimensions.

Typically a hard disk drive contains a magnetic disk that is rotated by a spin motor. The drive unit also has a head that magnetizes and senses the magnetic field of the disk. The head is typically located at the end of an actuator arm which can move relative to the magnetic disk. The actuator arm, motor and other components of a typical disk drive are installed in a rectangular container and communicate with a circuit board of a hard disk drive mounted in the container for processing. The circuit board of the hard disk drive is connected with another circuit board by a hard disk drive connector assembly for communication and handling of data.

Referring to FIG. 6, a conventional connector 200 comprises an insulative housing 210, a row of first contacts 224, two rows of second contacts 226, and two rows of third contacts 228. The connector 200 is connected to a circuit board 240 via the contacts 224, 226 and 228 being soldered to the circuit board 240. The insulative housing 210 integrally forms a top wall 230, a bottom wall 232 and two side walls 234. However, the top wall 230, bottom wall 232 and two side walls 234, which are used for guiding mating connectors and protecting the contacts therein, complicate the configurations of the connector assembly. Moreover, they complicate the injection mold toolings and process, which add costs to the connector assembly or the hard disk drive. Furthermore, the extra processing of the additional top, bottom and side walls wastes raw materials and is not cost effective.

It is thus desirable to provide a hard disk drive with connector assembly with simplified configurations which overcomes the problems discussed above.

SUMMARY OF THE INVENTION

Accordingly, an object of the present invention is to provide a hard disk drive with a connector assembly for connection between the hard disk drive and a computer system, and said hard disk drive has a simplified configuration and smaller weight.

To achieve the above object, a hard disk drive with connector assembly comprises a baseplate, a disk stack, a head stack, a spindle motor and a connector assembly. The connector assembly includes a connector and a circuit board. The connector comprises a insulative base and a plurality of contacts extending from the insulative base and being soldered to the circuit board at one end thereof the baseplate receiving the circuit board and the connector, includes a bottom wall, two side walls and two separating wall perpendicularly extending from the bottom wall in one end portion thereof. The insulative base of the connector, the bottom wall, the two side walls and the two separating walls corporately form three contacts receiving housing.

Other objects, advantages and novel features of the present invention will be drown from the following detailed description of preferred embodiments and the accompanying drawings.

DETAILED DESCRIPTION OF THE PREFERRED EMBODIMENT

Figure 1:
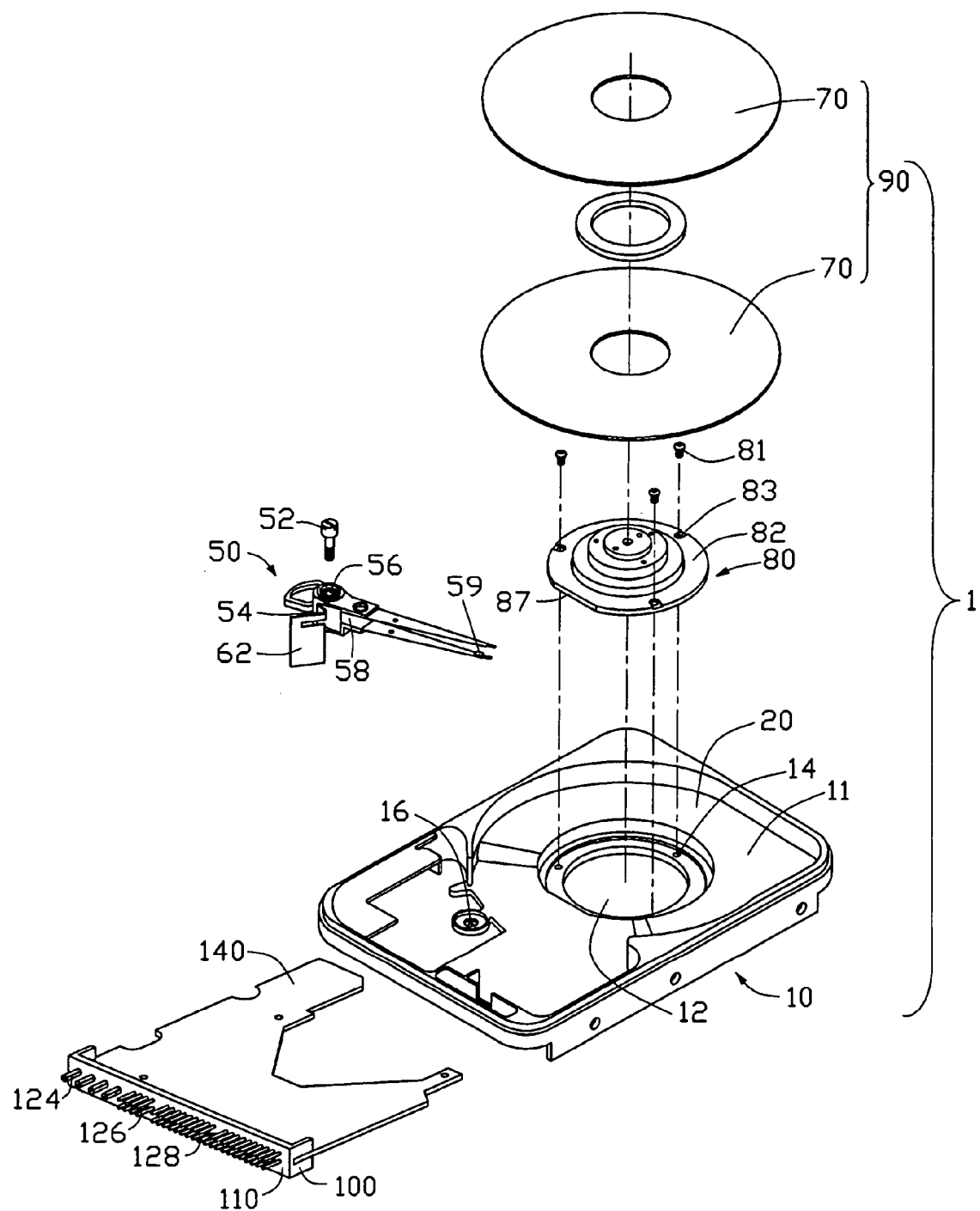
FIG. 1 is an exploded, isometric view of a hard disk drive with a connector assembly in accordance with the preferred embodiment of the present invention.

Referring to FIG. 1, a hard disk drive 1 in accordance with the preferred embodiment of the present invention comprises a baseplate 10, a head stack 50, a spindle motor 80, a disk stack 90 and a connector assembly. The connector assembly comprises a connector 100 and a circuit board 140 engaged with the connector 100.

Figure 2:
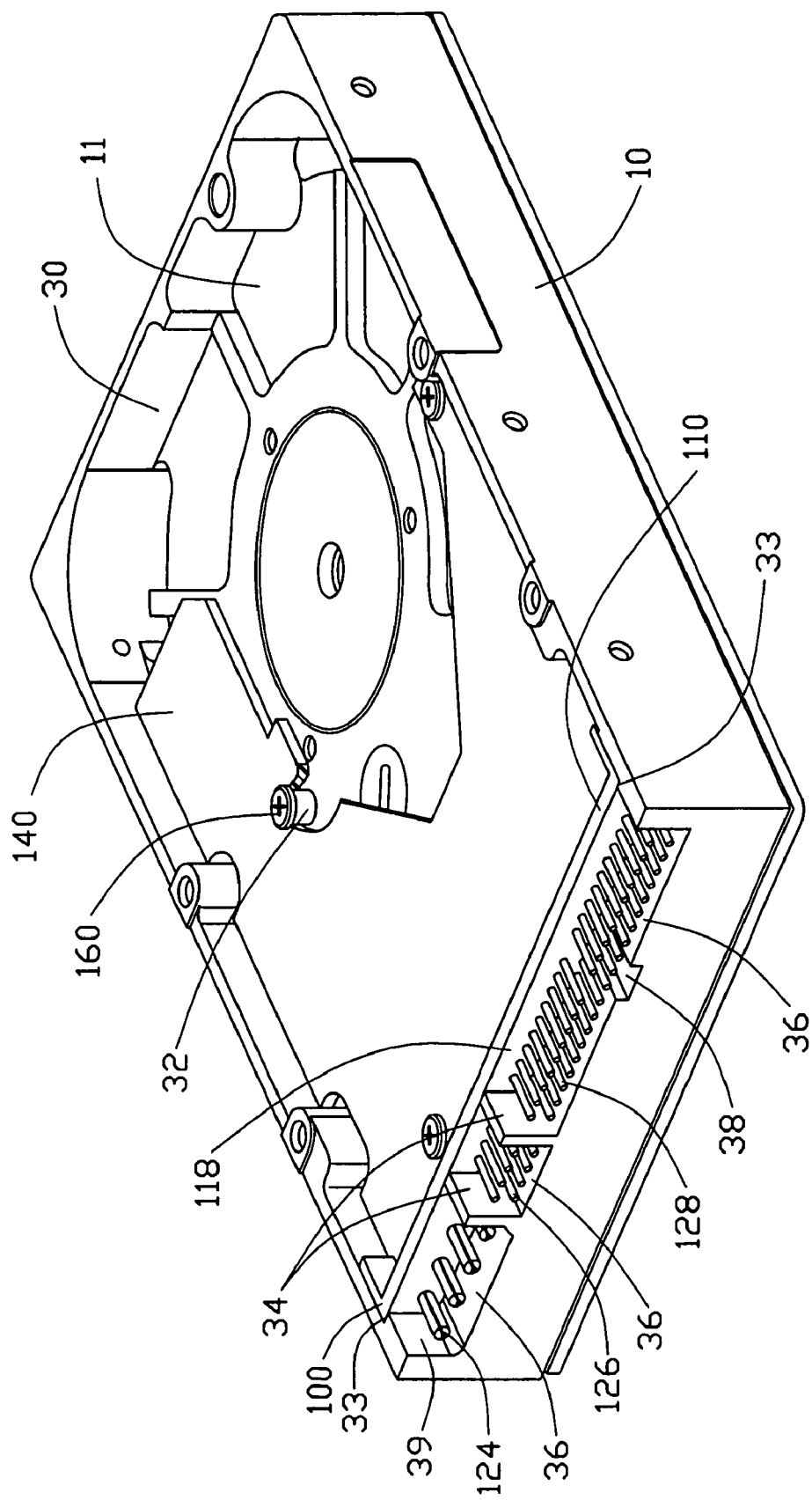
FIG. 2 is an assembled view of FIG. 1, but viewed from another aspect.

Referring also to FIG. 2, the baseplate 10 comprises a separator 11 in a central portion thereof defining a data storage housing 20 and a controller housing 30. The combined connector 100 and the circuit board 140 are received in the controller housing 30. A plurality of pillars 32 extends perpendicularly from the separator 11 in the controller housing 30, each pillar 32 defines a screw hole (not shown) therein. The controller housing 30 forms a bottom wall 36 and two side walls 39 at an end portion of the baseplate 10. Two spaced connector separating walls 34 extend perpendicularly from the bottom wall 36. A cutout 38 is defined in an upper face of the bottom wall 36 for preventing misinserting a matching connector. A step shoulder 33 is formed at an inner side of each side walls 39.

Figure 3:
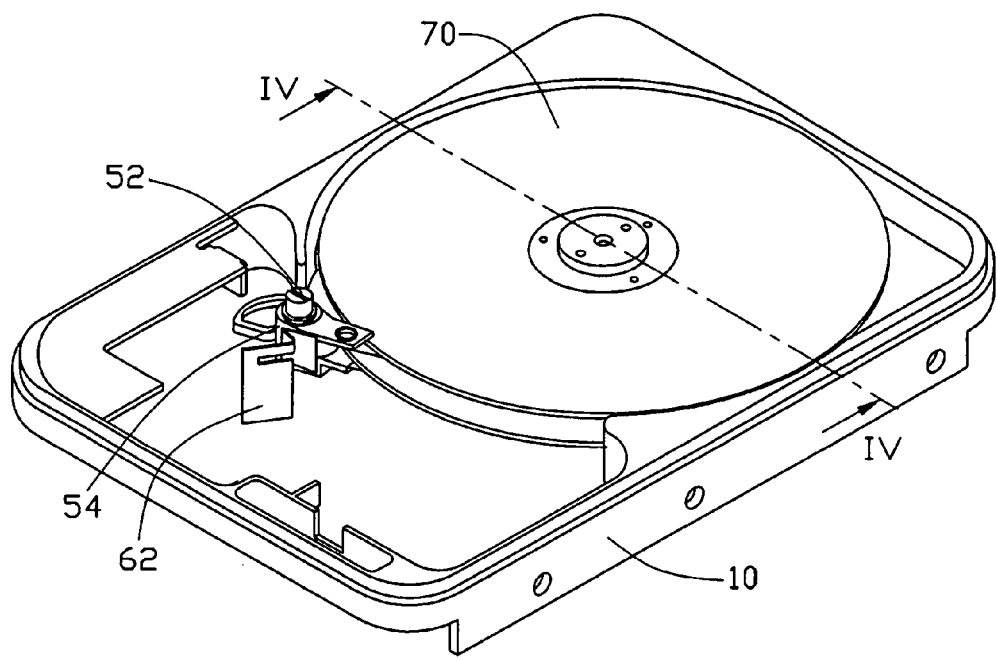
FIG. 3 is an assembled view of FIG. 1, but without the connector assembly.
Figure 4:
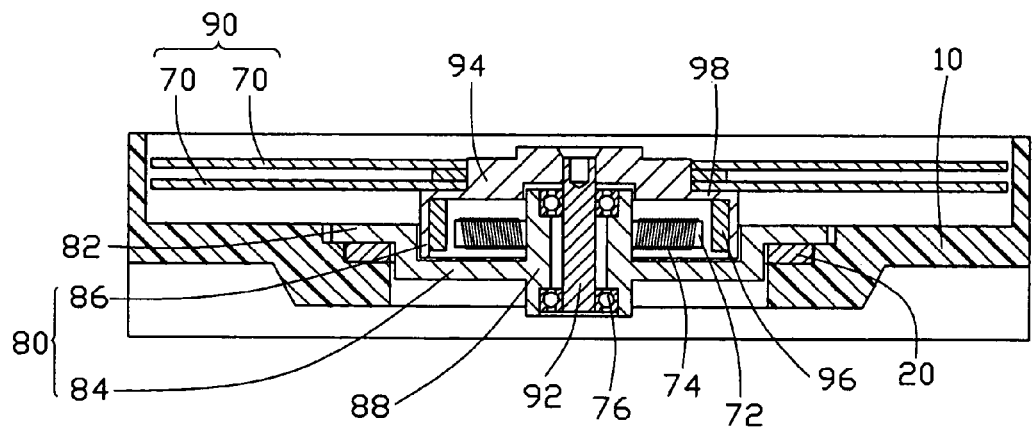
FIG. 4 is a schematic, cross-sectional view of FIG. 3 taken along line IV—IV.

Referring also to FIGS. 3 and 4, the head stack 50, the spindle motor 80 and the disk stack 90 are received in the data storage housing 20. The data storage housing 20 defines a screw hole 16. A stepped central through opening 12 is defined in the separator 11 of the baseplate 10 for supportingly receiving the spindle motor 80. A step 13 is thus formed in the baseplate 10 around a bottom portion of the through opening 12. A plurality of screw holes 14 is defined in the step 13. The through opening 12 is not completely round-shaped and forms a straight sidewall corresponding to a chord portion 87 of the spindle motor 80 for positioning.

In the illustrated embodiment of the present invention, the disk stack 90 comprises two hard disks 70. The disk stack 90 is mounted onto the spindle motor 80. A surface of each hard disk 70 is coated with a thin layer of magnetized material, for storage of information. The spindle motor 80 comprises a stator 84 and a rotor 86. The stator 84 comprises a central tubular base portion 88, and an circumferential flange 82. The flange 82 defines a plurality of fixing holes 83 therein for extension of screws 81 thereinto. A plurality of stator laminations 72 extends radially outwardly from the base portion 88. A winding 74 is wound around each stator lamination 72. A pair of bearings 76 is received in the base portion 88, the bearings 76 rotatably connecting the rotor 86 to the stator 84.

Referring particularly to FIG. 4, the rotor 86 comprises a spindle shaft 92, a hub 94 fixed around a top end of the spindle shaft 92, and an annular magnet 96 attached to an inside of the hub 94. The spindle shaft 92 is received in the base portion 88, and connected with the bearings 76. The rotor 86 is thus rotatably connected to the stator 84. The hub 94 comprises a lower circumferential shoulder 98. The disk stack 90 engages around the hub 94, with a lower hard disks 70 supported on the shoulder 98, and an upper hard disks 70 secured to the hub 94 by a clamp (not shown). The magnet 96 closely surrounds the stator laminations 72, thereby defining a gap between the stator laminations 72 and the magnet 96.

The head stack 50 of the present invention is of the moving coil type. The head stack 50 comprises a head positioner assembly 54 defining a fixing bore 56 therein. The head positioner assembly 54 supports a plurality of individual cantilever arms 58 each having a read/write transducer head 59 at a distal end thereof. A suitable actuator motor (not shown) such as a movable coil motor is provided, together with a corresponding motor controller 62. The actuator motor and motor controller 62 are used to displace the read/write transducer heads 59 through generally radial traverses relative to the hard disks 70.

In assembly, the spindle motor 80 is received in the through opening 12 of the baseplate 10, with the fixing holes 83 of the spindle motor 80 aligned with the screw holes 14 of the step 13. The screws 81 extend through the fixing holes 83, and engage in the screw holes 14 of the step 13. The hard disks 70 of the disk stack 90 are fixed on the hub 94 of the rotor 86 by the clamp (not shown).

To mount the head stack 50 on the baseplate 10, a screw shaft 52 extends through the fixing bore 56 of the head stack 50 and engages in the screw hole 16 of the baseplate 10. The read/write transducer heads 59 are in close proximity with respective upper and lower surfaces of the hard disks 70. A damper (not shown) can be attached under the head stack 50 for stable support and suitable vibration absorption. Thus dynamic head loading properties of the read/write transducer heads 59 are improved.

Figure 5A:
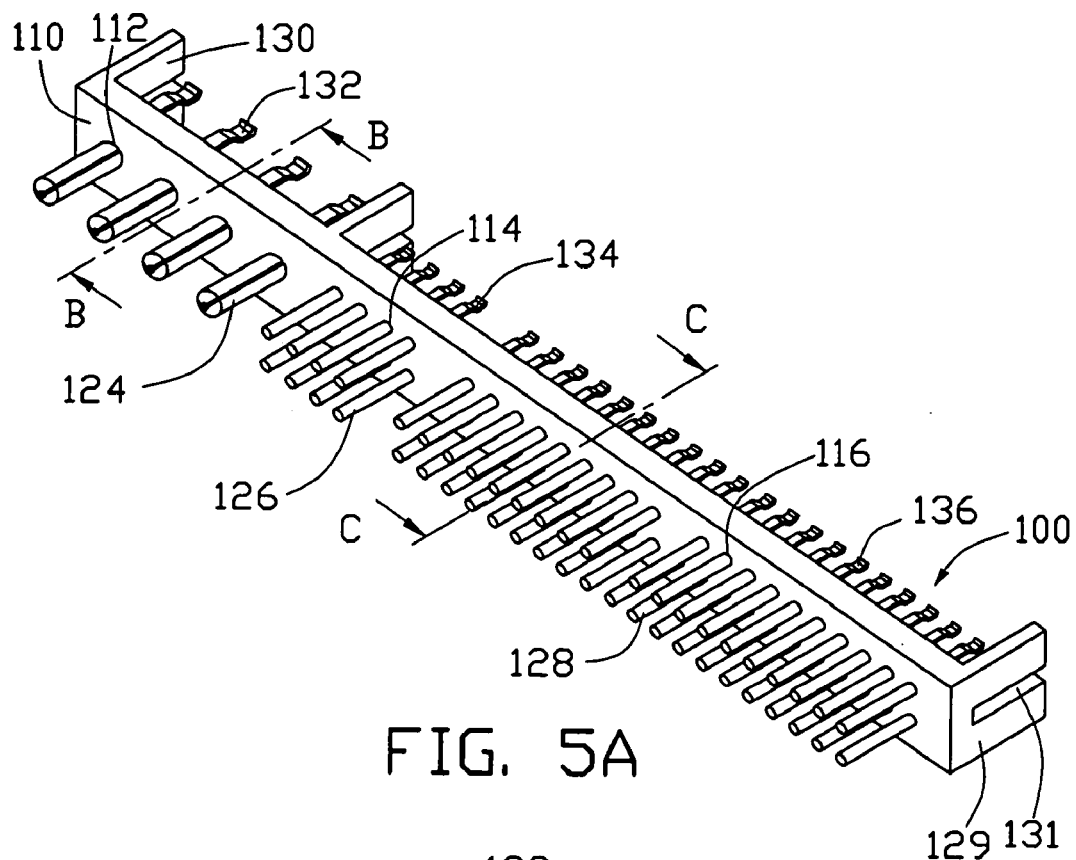
FIG. 5A is an isometric view of a connector of the hard disk drive of FIG. 1.
Figure 5B:
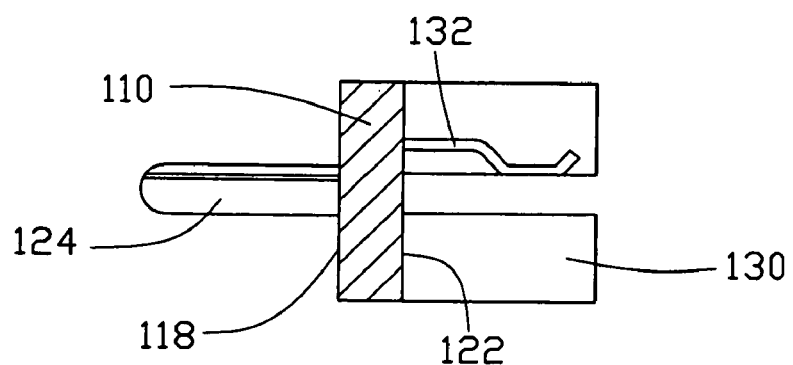
FIG. 5B is a cross-sectional view of the connector of FIG. 5A, taken along line B—B.
Figure 5C:
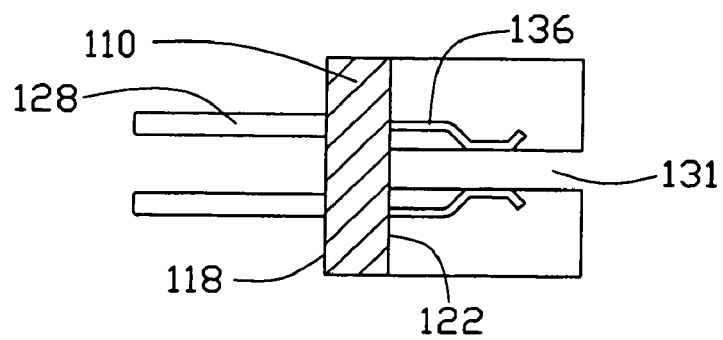
FIG. 5C is a cross-sectional view of the connector of FIG. 5A, taken along line C—C.

Referring also to FIGS. 5A–5C, the connector 100 of the connector assembly of the hard disk drive 1 comprises an elongated insulative base 110, a row of first contacts 124, two rows of second contacts 126 and two rows of third contacts 128. The base 110 defines a row of first passages 112, two rows of second passages 114 and two rows of third passages 116, which are substantially parallel to each other, for receiving the corresponding first contacts 124, second contacts 126 and the third contacts 128. Two connecting walls 129, 130 extend perpendicularly from opposite distal ends of the base 110. The connecting walls 129, 130 each define a slot 131 for engaging with the circuit board 140. The width of the slot 131 is slightly smaller than the thickness of the circuit board 140, so that when the circuit board 140 is interferentially connected in the slots 131, a firm connection is achieved. The passages 112, 114, 116 extend between a front face 118 and a rear face 122 of the base 110, for respectively receiving and retaining the first, second and third conductive contacts 124, 126, 128 therein. The contacts 124, 126, 128 respectively comprise tail sections 132, 134, 136 extending beyond the rear face 122, for being soldered to the circuit board 140.

The circuit board 140 is secured to the connector 100 by engaging in the slots 131 of the base 110 and having the tail sections 132, 134, 136 of the contacts 124, 126, 128 soldered thereon. The circuit board 140 defines a plurality of fixing holes (not labeled) corresponding to the pillars 32 for extension of pillars therethrough. A plurality of screws 160 engage in the screw holes of the pillars 32 thereby securing the circuit board 140 to the baseplate 10.

When the circuit board 140 is mounted to the baseplate 10, the base 110 of the connector 100 abuts against the shoulders 33 of the baseplate to insure the stability of the connector 100. The front face 118 of the insulative base 110, the bottom wall 36 and the two side walls 39, together with the two separating walls 34 perpendicular to the bottom wall 36, corporately defines three receiving housings for the corresponding contacts 124, 126, 128.

Figure 6:
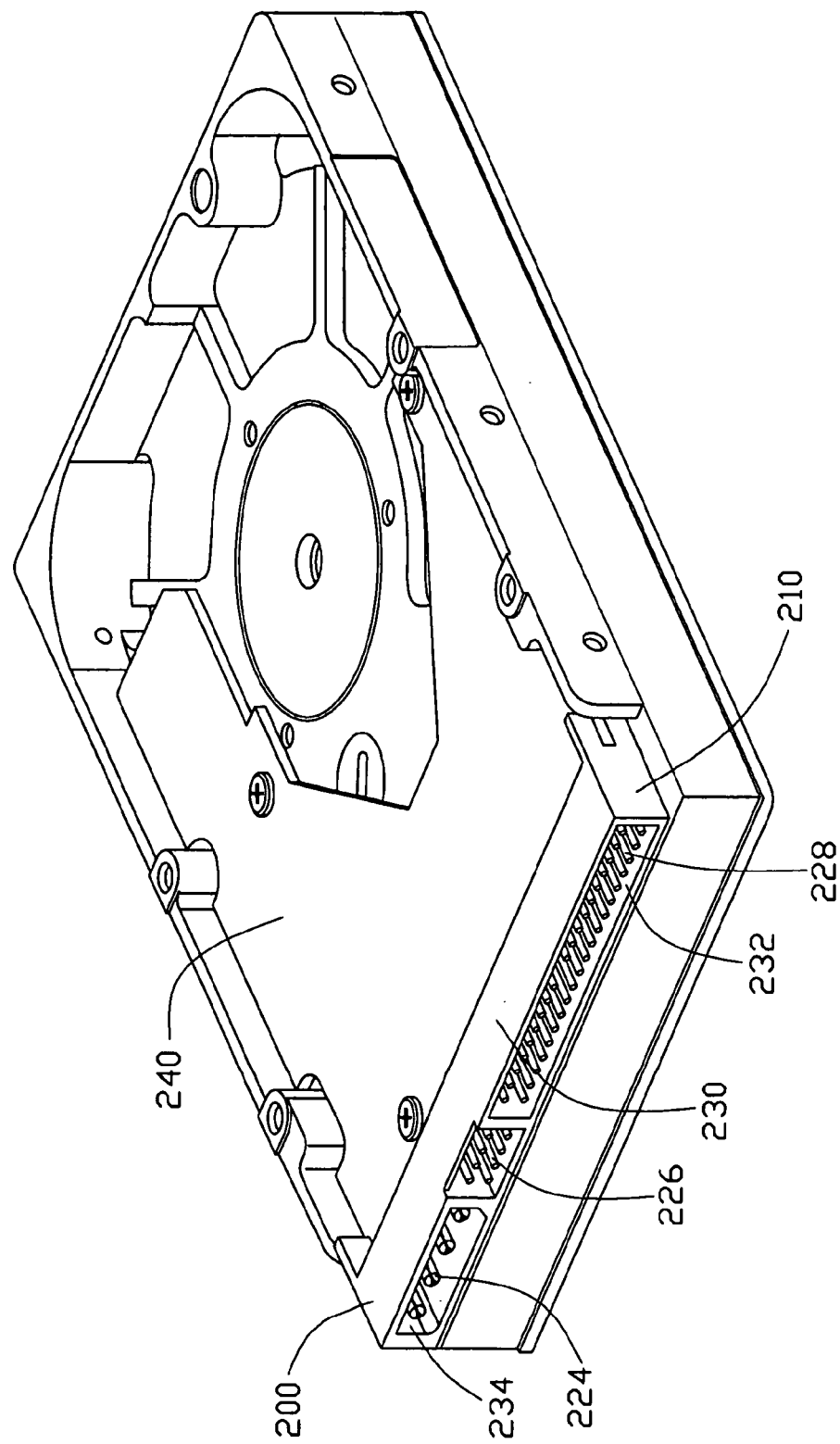
FIG. 6 is an isometric view of a conventional hard disk drive with a connector assembly.

The conventional connector 200 disclosed in FIG. 6 comprises an extra top wall 230, an extra bottom wall 232 and two extra side walls 234. The additional top wall 230, bottom wall 232 and two side walls 234, which are used for guiding mating connectors and protecting the contacts therein, complicate the configurations of the connector assembly. While the hard disk drive 1 of the present invention incorporating the connector 100 with simplified configuration simplifies the injection mold toolings and process, and reduces costs to the connector or the hard disk drive.

While the present invention has been illustrated by the description of preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A connector assembly comprising:
   a circuit board;
   a connector comprising an insulative base, and a plurality of contacts extending from the insulative base and being soldered to the circuit board at one end thereof; and
   a baseplate receiving the circuit board and the connector, the baseplate comprising a bottom wall, two side walls and at least one separating wall extending perpendicularly from the bottom wall at one end portion thereof;
   wherein the insulative base of the connector, the bottom wall, the two side walls and the at least one separating wall cooperatively form at least two receiving housing to receive the contacts therein.

2. The connector assembly as claimed in claim 1, wherein the insulative base defines a plurality rows of passages substantially parallel with each other to receive the corresponding contacts.

3. The connector assembly as claimed in claim 1, wherein the insulative base extends two connecting walls from two distal ends thereof.

4. The connector assembly as claimed in claim 3, wherein the connecting walls respectively define a slot to engage the circuit board with the insulative base.

5. The connector assembly as claimed in claim 1, wherein each of the contacts forms a tail section extending beyond a rear face of the insulative base for being soldered to the circuit board.

6. The connector assembly as claimed in claim 1, wherein the baseplate forms a plurality of pillars, the circuit board defines a plurality of fixing holes to receive the pillars thereof.

7. The connector assembly as claimed in claim 6, wherein the plurality of pillars penetrate through the fixing hole of the circuit board, corresponding screws engage in the pillars to mount the circuit board to the baseplate.

8. The connector assembly as claimed in claim 1, wherein the bottom wall of the baseplate defines a cutout for preventing mis-inserting a matching connector.

9. The connector assembly as claimed in claim 1, wherein a step shoulder is formed at the side wall of the baseplate, the insulative base abuts against the shoulder to insure stability of the connector.

10. A hard disk drive comprising:
   a baseplate forming an upper housing and a lower housing, one end portion of the lower housing comprising a bottom wall, two side walls and at least one separating wall extending perpendicularly from the bottom wall;
   a motor received in the upper housing of the baseplate, the motor comprising a stator and a rotor rotatably engaged with the stator;
   a disk mounted on the rotor in the upper housing;
   a head assembly received in the upper housing of the baseplate, the head assembly comprising a head positioner assembly supporting a plurality of individual arms having read/write transducer heads at distal ends thereof;
   a circuit board received in the lower housing of the baseplate; and
   a connector comprising an insulative base and a plurality of contacts extending through the insulative base and being soldered to the circuit board at one end thereof;
   wherein the insulative base of the connector, the bottom wall, the two side walls and the at least one separating wall of the baseplate cooperatively form at least two receiving housings for receiving the contacts thereof.

11. The hard disk drive as claimed in claim 10, wherein the insulative base of the connector defines a plurality rows of passages substantially parallel with each other to receive the corresponding contacts.

12. The hard disk drive as claimed in claim 10, wherein the insulative base extends two connecting walls from two distal ends thereof.

13. The hard disk drive as claimed in claim 12, wherein the connecting walls respectively define a slot to engage the circuit board with the insulative base.

14. The hard disk drive as claimed in claim 10, wherein each of the contacts forms a tail section extending beyond a rear face of the insulative base for being soldered to the circuit board.

15. The hard disk drive as claimed in claim 10, wherein the baseplate forms a plurality of pillars, the circuit board defines a plurality of fixing holes to receive the pillars thereof.

16. The hard disk drive as claimed in claim 10, wherein the bottom wall on the lower housing of the baseplate defines a cutout for preventing mis-inserting a matching connector.

17. The hard disk drive as claimed in claim 10, wherein a step shoulder is formed at the side wall of the baseplate, the insulative base abuts against the shoulder to insure stability of the connector.

18. The hard disk drive as claimed in claim 10, wherein the stator of the motor is combined with a plurality of radially extending stator laminations.

19. The hard disk drive as claimed in claim 18, wherein the rotor of the motor comprises a hub for rotatably mounting the disk assembly thereon, and an annular magnet encircling the stator laminations.

20. A hard disk drive comprising:
   a baseplate receiving therein a motor, a head assembly, a printed circuit board and an electrical connector mounted to an exterior edge thereof;
   the baseplate defining a pair of side walls with at least one separating wall therebetween in a parallel relation to form at least two receiving cavities thereabouts, said receiving cavities exposed to an exterior in a front-to-back direction;
   the connector defining an elongated base with two connecting walls extending along said front-to-back direction from two opposite ends of the base; and
   a plurality of contacts extending through said base in said front-to-back direction and disposed in said at least two receiving cavities.

* * * * *